US00RE36436E

United States Patent [19]

Kyle

[11] E Patent Number: Re. 36,436

[45] Reissued Date of Patent: Dec. 14, 1999

[54] PORT ASSEMBLY FOR A MARINE VESSEL

[75] Inventor: James H. Kyle, Keene, N.H.

[73] Assignee: Pompanette, Inc., Charlestown, N.H.

[21] Appl. No.: 09/149,756

[22] Filed: Sep. 8, 1998

Related U.S. Patent Documents

Reissue of:

[64] Patent No.: 5,758,593
Issued: Jun. 2, 1998
Appl. No.: 08/746,163
Filed: Nov. 6, 1996

[51] Int. Cl.[6] ..... B63B 19/00

[52] U.S. Cl. ..... 114/178; 114/201 R; 49/386; 49/484.1; 16/285

[58] Field of Search ..... 114/173, 176, 114/177, 178, 201 R, 203; 16/217, 285, 378, 379; 49/386, 398, 476.1, 484

[56] References Cited

U.S. PATENT DOCUMENTS 4,394,044 7/1983 Hough et al. ..... 114/201 R
5,231,948 8/1993 Malmanger et al. ..... 114/201 R
5,676,082 10/1997 Kyle ..... 114/201 R

*Primary Examiner*—Jesus D. Sotelo
*Attorney, Agent, or Firm*—Dougherty & Troxell

[57] ABSTRACT

A port assembly for a marine vessel, including a lens element and three concentric stainless steel rings which are superimposed upon one another. A first of the rings includes a base portion forming an outer trim ring, a second portion which is generally parallel to the base portion and a sloping riser which defines an angle of between 105° and 135° with a base portion. The sloping riser also connects the base portion and the second portion. A second of the stainless steel stampings also includes a stepped cross-section with two risers and an intermediate potion connecting the two risers. The second of the risers also includes a sloped portion which is welded to the sloped portion of the sloped riser. A third stainless steel stamping, or clamping ring, is bolted to the intermediate portion of the second riser and, together with the base portion of the first ring, form a clamp for securing the port assembly to the wall of the vessel. The assembly also includes a hinge for pivotally mounting the lens element inwardly of the vessel's wall.

18 Claims, 3 Drawing Sheets

PORT ASSEMBLY FOR A MARINE VESSEL

Matter enclosed in heavy brackets [ ] appears in the original patent but forms no part of this reissue specification; matter printed in italics indicates the additions made by reissue.

FIELD OF THE INVENTION

The present invention relates to a port or hatch assembly for a marine vessel or the like, and more particularly to an improved multi-piece stainless steel port assembly for a yacht or other watercraft.

BACKGROUND FOR THE INVENTION

Cast aluminum hatch and port assemblies for marine vessels are well known. Such assemblies are commercially available from Pompanette, Inc., of Chalestown, N.H., the assignee of the present invention. Such assemblies are described in my co-pending applications entitled "Marine Hatch Assembly," Ser. No. 08/583,479, filed on Jan. 5, 1996, and "Improved Hatch Assembly for a Marine Vessel," Ser. No. 08/600,542, filed on Feb. 13, 1996, now U.S. Pat. No. 5,676,082 issued Oct. 14, 1997 which are assigned to the same assignee as the present invention. Both applications are included herein in their entireties, by reference. Such assemblies typically include a cast aluminum alloy frame, an elastomeric gasket and a clear plastic cover. The cover is optically made of a clear or tinted LEXAN sheet, a product of General Electric, which is known for its high strength.

As used herein, port assemblies are differentiated from hatch assemblies by being installed in the side of a vessel, i.e., a generally vertical plane, while hatch assemblies are typically installed in a deck, i.e., in a generally horizontal surface. Furthermore port assemblies typically hinge inboard or inward while hatches open outward. In addition, port assemblies are typically provided to allow right and air to pass through the port assembly, while a hatch is commonly used for an individual and/or marine paraphernalia to pass through an opening in the deck.

Stainless steel port assemblies are also commercially available and frequently preferred for marine vessels which are used in salt water. However, such assemblies are relatively expensive and, at times, difficult to install. In addition, the commercially-available assemblies sometimes require excessive amounts of calking and may not readily fit a variety of boats, with sidewalls of different thicknesses.

It is presently believed that there may be a relatively large commercial market for an improved multi-piece stainless steel port assembly. Accordingly, a port assembly in accordance with the present invention has been developed which facilitates installation on a boat or yacht, provides sufficient flexibility to conform to the slight curvature of a hull or cabin wall, and which is competitively priced. In addition, port assemblies, in accordance with the present invention, are resistant to corrosion and present a pleasing appearance from the inside, as well as the outside, of the marine vessel. The assemblies also advantageously include an inset lens, are self-draining, reduce the need for caulking and are durable.

BRIEF SUMMARY OF THE INVENTION

In essence, the present invention contemplates a stainless steel port assembly which includes three stainless steel stampings, each of which defines a ring-shaped opening. A first of the stainless steel stampings includes a base portion and a second portion which is generally parallel with the base portion, but separated therefrom by a sloped riser, which preferably defines an angle of between about 105° to about 145° with the base portion. A second of the ring-shaped stainless steel stampings is constructed and arranged to fit in a concentric nested relationship with the first stainless steel stamping. The second stamping also includes a stepped cross-section with a first riser, a second riser and an intermediate portion connecting the first and second risers, with the base of the first riser abutting the base portion of the first ring-sped stamping, and with the intermediate portion generally parallel to the base portion. The second riser also includes a sloped portion which mates, i.e., is parallel to, and which is in abutting relationship with the to sloped riser of the first ring-shaped stamping. In a preferred embodiment of the invention, the sloped portion of the second riser also defines an angle of between about 105° to about 145° with the intermediate portion, and is essentially equal to, if not equal to the angle formed by the sloped riser in the first stainless steel stamping with its face. In a preferred embodiment of the invention, the sloped portion of the second riser is in a lower portion thereof, and an upper portion of the second riser is essentially perpendicular to the intermediate portion. Means, such as a welding bead, fixes the first and second stainless steel rings in a nested relationship, with a first riser of the second ring-shaped stamping abutting the base portion of the first ring-shaped stamping.

The invention will now be described in connection with the accompanying drawings, wherein like reference numerals have been used to identify like parts.

DETAILED DESCRIPTION OF THE PREFERRED EMBODIMENT OF THE INVENTION

Figure 1:
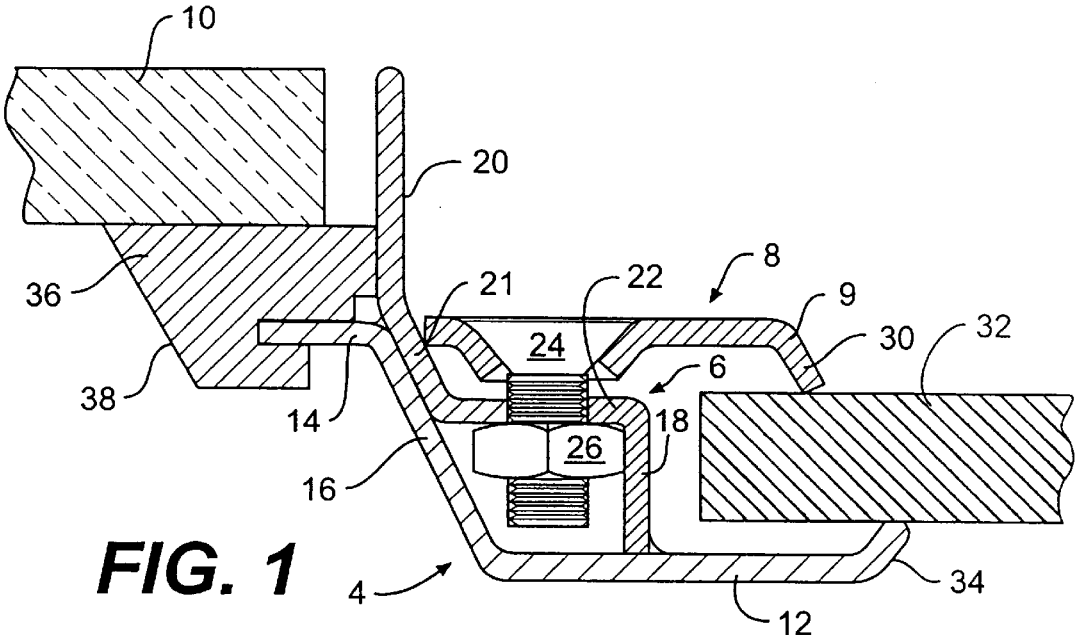
FIG. 1 is a cross-sectional view of a multi-piece port assembly in accordance with a preferred embodiment of the invention.
Figure 4:
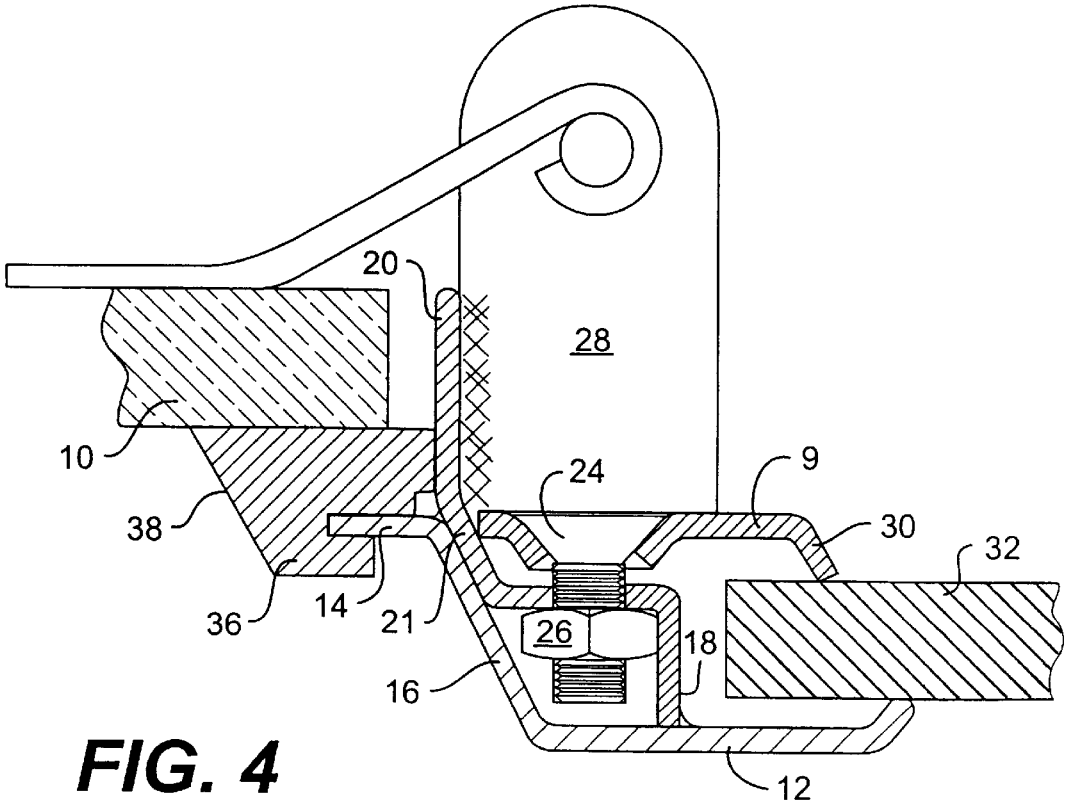
FIG. 4 is a cross-sectional view of the port assembly shown in FIG. 1, but including a bracket and hinge for pivotally mounting a lens.

As shown in FIGS. 1 and 4, a port assembly 2 for a marine vessel, or the like, includes three concentric stainless steel stampings, or rings, 4, 6 and 8. The assembly 2 also includes a lens element 10 which defines a generally ring shape, such as a circle, oval, square or rectangle, as are commonly used in boats, yachts and other marine vessels, or the like. The lens element is typically made of LEXAN, or other suitable plastic, and may be clear or tinted, in accordance with an owner's preference.

The three stainless steel rings 4, 6 and 8 are arranged in a stacked or superposed relationship, with a first of the rings 4 forming an outer trim ring, i.e., on the outside of a hull or cabin wall. The ring 4 includes a base portion 12 and a second portion 14, which is preferably parallel to the base portion 12. In other words, the second portion 14 extends inwardly toward the center of the port assembly 2. The ring 4 also includes a riser 16, which forms an angle of greater than 90° and less than 180° to the base portion 12. In the preferred embodiment of the invention, the angle is between 105° and 135°, and preferably about 117°. The riser 16 connects the base portion 12 and second potion 14 to form a generally stepped cross-section.

A second of the concentric rings 6 is disposed in a nested and/or superimposed relationship with respect to the ring 4 and also defines a stepped cross-section. For example, the second ring 6 includes a first riser 18, a second riser 20 and an intermediate portion 22, which connects the first riser 18 and second riser 20. In the preferred embodiment of the invention, the intermediate portion 22 is generally parallel with the base portion 12 and second portion 14 of the first ring 4. The first riser 18 is preferably perpendicular to and abuts the base portion 12 and is fixed thereto by means of a welding bead, or the like.

The second riser 20 also includes a lower, or inner angled, portion 21, which forms an angle with intermediate portion 22. The angled portion 21 fits flush against the riser 16. Therefore, the angle formed with respect to the intermediate portion 22 is essentially equal to the angle formed between the riser 16 and base portion 12. In a preferred embodiment of the invention, a welding bead at the intersection of the second portion 14 and riser 20 fixes the angled portion 21 and riser 16 in a superimposed position and forms a unitary structure.

The intermediate portion 22 also defines an opening, or hole, for receiving or allowing a threaded bolt 24 to pass therethrough. A threaded nut 26 is welded, or otherwise fixed, to the bottom or inner surface of the intermediate portion 22 prior to welding the first and second rings 4 and 6 into a unitary structure. A bracket 28 is also fixed to the ring 6, as shown schematically in FIG. 4. For example, the upwardly extending bracket 28 may be welded to the second riser 20.

A third of the stainless steel stampings, or rings, 8 is generally parallel to the first and second rings and includes an outwardly extending portion 9 which is generally parallel to the base portion 12 in intermediate portion 22. The ring 8 also fits in a nested and/or superimposed relationship with the first and second rings 4 and 6. The ring 8 also includes a countersunk hole, or opening, for receiving the bolt 24. The ring 8 typically includes a plurality of countersunk openings for receiving a number of bolts, but only one opening and one bolt are shown in FIG. 4. The ring 8 also includes or defines a pair of openings 27 on an inner portion thereof in order to pass over the brackets 28 and hinges 29.

As shown in FIGS. 1 and 4, the outwardly extending portion 9 of ring 8 extends outwardly away from the center of the port assembly 2 and includes a first clamping ring element 30 for engaging an inside wall 32 of the hull or cabin of a marine vessel. The base portion 12 also includes a second clamping ring element 34 for sealingly engaging the outer wall of the vessel. These clamping elements 30 and 34 extend around the periphery of rings 4 and 8 and form a clamp for clamping the port assembly 2 within a port opening in the vessel wall. The arrangement also facilitates installation and allows the port assemblies to be installed in vessels having different wall thickness. The unique design of the port assembly also allows the assemblies to compensate for slight curvature or unevenness in a vessel's wall.

The port assembly 2 also includes a ring-shaped gasket 36 of rubber, or other suitable material, for sealingly engaging the lens element 10 when the port is in a closed position. The gasket 36 also includes a ring-shaped groove that fits over the second portion 14 of the ring 4 in a manner which will be well understood by those skilled in the art. The ring-shaped gasket 36 also includes an outwardly sloping wall portion 38 which slopes away from the center of the port and directs water away from the interior of the vessel, i.e., provides a self-draining port assembly.

Figure 2:
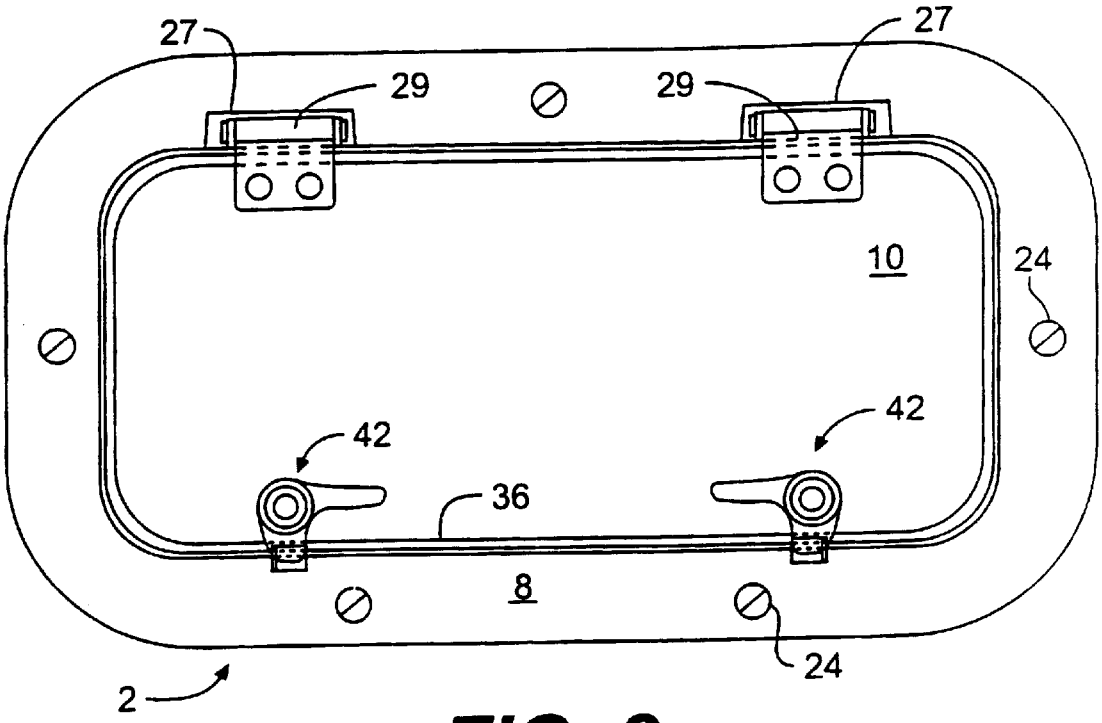
FIG. 2 is a top or plan view of a generally rectangular port assembly according to the invention.
Figure 3:
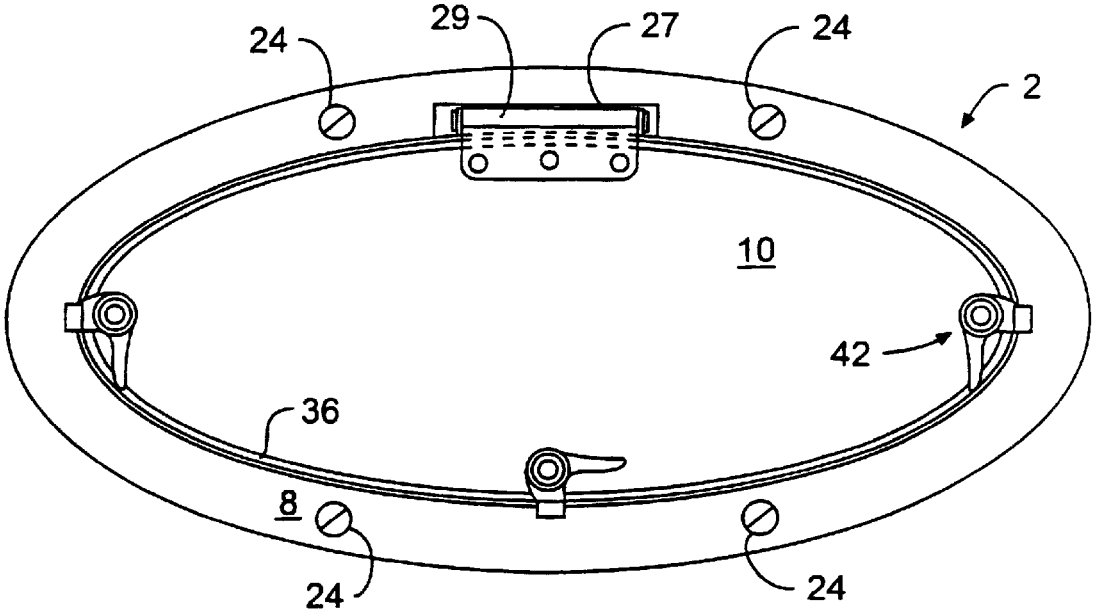
FIG. 3 is a top or plan view of an oval port assembly according to the invention.

As shown in FIGS. 2 and 3, the ring-shaped port assembly 2 may have a variety of shapes, as will be well understood by those skilled in the art. The assembly 2 also includes one or more hinges 29 which allow the lens element 10 to swing inwardly to allow fresh air to enter the cabin of the vessel. One or more dogs, or clamping assemblies, are also provided for clamping the port in a closed position.

While the invention has been defined in accordance with its preferred embodiment, it should be recognized that changes and modifications may be made therein without departing from the scope of the appended claims.

What is claimed is:

1. A port assembly for a marine vessel, comprising a lens element and a first stainless steel ring surrounding said lens element, said first stainless steel ring having a stepped cross-section with a base portion, a second portion which is generally parallel with said base portion, and a sloped riser which defines an angle of greater than 90° and less than 180°, with said sloped riser connecting said base portion and said second portion;

a second stainless steel ring constructed and arranged to fit in a concentric nested relationship with said first stainless steel ring and having a stepped cross-section with a first riser, a second riser and an intermediate portion connecting said first and second risers, and with said first riser of said second stainless steel ring abutting said base portion of said first stainless steel ring, said second riser of said second stainless steel ring including a sloped portion abutting said sloped portion of said first stainless steel ring, and means for fastening said sloped portion of said second stainless ring and said sloped riser of said first stainless steel ring in a juxtaposed relationship;

a third stainless steel ring having an outwardly extending portion and means for fastening said third stainless steel ring to said intermediate portion of said second stainless steel ring, with said outwardly extending portion together with said base portion of said first stainless steel ring forming a clamp for securing the port assembly to the wall of a marine vessel.

2. A port assembly for a marine vessel according to claim 1, in which the angle formed by said base portion and said sloped riser is between 105° to about 135°.

3. A port assembly for a marine vessel according to claim 2, in which the angle formed by said base portion and said sloped portion is about 117°.

4. A port assembly for a marine vessel, or the like in accordance with claim 2, which includes means for pivotally mounting said lens element inwardly of the marine vessel and gasket means for sealingly engaging said lens element when said lens element is in a closed position.

5. A port assembly for a marine vessel in accordance with claim 4, in which said gasket means sealingly engages said second portion of said first stainless steel ring and abuts said second riser of said second stainless steel ring.

6. A port assembly for a marine vessel in accordance with claim 5, in which said gasket means includes a sloping surface which directs water away from the inside of the vessel.

7. A port assembly for a marine vessel in accordance with claim 5, in which said means for fastening said third stainless steel ring to said intermediate portion of said second stainless steel ring comprises a threaded bolt and nut, and wherein said nut is fixed to said intermediate portion of said second stainless steel ring.

8. A port assembly for a marine vessel comprising a lens element and three concentric stainless steel stampings, each of which has essentially the same shape as the edge surrounding said lens element, a first of said stainless steel stampings having a cross-section with a base portion forming an outer trim ring, a second portion which is generally parallel with said base portion and a sloping riser which defines an angle of between about 105° and 135°, with said sloping riser connecting said base portion and said second portion;

a second of said stainless steel stampings disposed in a nested relationship with said first of said stainless steel stampings and having a stepped cross-section with a first riser, a second riser and an intermediate portion connecting said first and second risers, and with said first riser of said second stainless steel stamping abutting said base portion of said first stainless steel stamping, and with said intermediate portion generally parallel to said base portion, said second riser of said second stainless steel stamping including a sloped portion which is generally parallel with and abutting said sloping riser of said first stainless steel stamping, and an inwardly extending portion which is generally perpendicular to said base portion of said first stainless steel stamping, and means for permanently fastening said sloping portions of said second riser to said sloping riser of said first stamping in a juxtaposed position;

a third of said stainless steel stampings, having an outwardly extending portion and bolt means for fastening said third stainless steel stamping to said intermediate portion of said second stainless steel stamping with said outwardly extending potion, together with said base portion of said first stainless steel stamping forming a clamp for securing the port assembly to a wall of the marine vessel, and means for pivotally mounting said lens element inwardly of the marine vessel, and gasket means for sealingly engaging said lens element when said lens element is in a closed position.

9. A port assembly for a marine vessel, according to claim 8, in which said means for permanently fastening said sloping portion of said second riser to said sloping riser comprises a welding bead.

10. A port assembly for a marine vessel, according to claim 9, in which said first riser of said second stamping is welded to said base portion of said first stainless steel stamping.

11. A port assembly for a marine vessel, according to claim 10, in which said bolt means includes a nut which is permanently fastened to said intermediate portion between said intermediate portion and said base portion of said first stainless steel stamping.

12. A port assembly for a marine vessel, according to claim 9, in which said means for p pivotally mounting said lens element includes a hinge assembly and a bracket which is welded to said perpendicular inwardly extending portion of said second riser.

*13. A port assembly having a lens element and being affixed to a wall of marine vessel, the port assembly comprising:*

*a) a first stainless steel ring having a base portion, a second portion, and a sloped riser connecting said base portion and said second portion, said sloped riser forming an angle of less than 180° with said base portion;*

*b) a second stainless steel ring constructed and arranged to fit in a concentric nested relationship with the first stainless steel ring, the second stainless steel ring having a riser, and a portion extending from the riser and forming an angle of less than 180° with the riser, at least one of the riser and the extending portion being affixed to the first stainless steel ring; and,*

*c) a third stainless steel ring having an outwardly extending portion and means for fastening the third stainless steel ring to the second stainless steel ring with the outwardly extending portion together with the base portion of the first stainless steel ring forming a clamp for securing the port assembly to the wall of the marine vessel.*

*14. The port assembly of claim 13 wherein the angle formed by the base portion and the sloped riser of the first stainless steel ring is between 105° and 135°.*

*15. The port assembly of claim 13 wherein the angle formed by the base portion and the sloped riser of the first stainless steel ring is approximately 117°.*

*16. The port assembly of claim 13 further comprising means for pivotally mounting the lens element inwardly of the wall of the marine vessel and gasket means sealingly contacting the lens element when the lens element is in a closed position.*

*17. The port assembly of claim 13 wherein the means for fastening the third stainless steel ring to the second stainless steel ring comprises a threaded fastener engaging the second and third stainless steel rings.*

*18. The port assembly of claim 13 wherein at least one of the riser and extending portion of the second stainless steel ring is welded to the first stainless steel ring.*

* * * * *